(12) United States Patent
Goudie

(10) Patent No.: US 7,584,944 B2
(45) Date of Patent: Sep. 8, 2009

(54) HYDRAULICALLY DAMPED BODY MOUNT WITH BOLT-THROUGH CONSTRUCTION

(75) Inventor: Robert J. Goudie, North Ridgeville, OH (US)

(73) Assignee: The Pullman Company, Milan, OH (US)

( * ) Notice: Subject to any disclaimer, the term of this patent is extended or adjusted under 35 U.S.C. 154(b) by 120 days.

(21) Appl. No.: 11/340,208

(22) Filed: Jan. 26, 2006

(65) Prior Publication Data

US 2006/0163785 A1 Jul. 27, 2006

Related U.S. Application Data

(60) Provisional application No. 60/647,240, filed on Jan. 26, 2005.

(51) Int. Cl.
*F16F 13/00* (2006.01)
(52) U.S. Cl. .............. 267/140.12; 267/141.5; 267/293
(58) Field of Classification Search .......... 267/136, 267/141.5, 140.12, 140.13, 141.2, 141.3, 267/141.4, 219, 292, 293, 140.5
See application file for complete search history.

(56) References Cited

U.S. PATENT DOCUMENTS

| | | | | | |
|---|---|---|---|---|---|
| 4,936,556 | A | * | 6/1990 | Makibayashi et al. | 267/140.13 |
| 5,080,330 | A | * | 1/1992 | Nanno | 267/140.12 |
| 5,199,691 | A | * | 4/1993 | Bouhier et al. | 267/140.12 |
| 5,286,011 | A | * | 2/1994 | Strand | 267/140.12 |
| 5,595,373 | A | * | 1/1997 | Ikeda | 267/140.12 |
| 5,690,320 | A | * | 11/1997 | Kanda | 267/140.12 |
| 6,557,836 | B2 | * | 5/2003 | Itoh | 267/140.11 |
| 6,561,501 | B2 | * | 5/2003 | Bouhier et al. | 267/140.12 |
| 6,698,731 | B2 | * | 3/2004 | Thornhill | 267/140.12 |
| 6,981,696 | B2 | * | 1/2006 | Hatano et al. | 267/140.12 |

* cited by examiner

*Primary Examiner*—Robert A Siconolfi
*Assistant Examiner*—Mariano Sy
(74) *Attorney, Agent, or Firm*—Harness, Dickey & Pierce, PLC

(57) ABSTRACT

A mount has an inner metal and an outer metal with an elastomeric bushing disposed between them. The elastomeric bushing includes a first pair of interconnected passages to control the damping rate during axial motion and a second, separate pair of interconnected passages to control the damping rate during motion orthogonal to the axial direction.

18 Claims, 8 Drawing Sheets

US 7,584,944 B2

HYDRAULICALLY DAMPED BODY MOUNT WITH BOLT-THROUGH CONSTRUCTION

FIELD OF THE INVENTION

The present invention relates to a hydraulically damped mount. More particularly, the present invention relates to a hydraulically damped mount having a bolt through construction which has axial damping at one frequency and radial damping at another frequency.

BACKGROUND OF THE INVENTION

There are numerous applications that exist where two members are attached to each other through a vibration damping device. These applications include automobile body mounts, subframe mounts, cradle mounts, engine mounts and the like. The vibration damping devices dampen or isolate vibrations (including noises induced by the vibrations) between the two members.

A fluid filled active vibration damping device has been proposed as one type of such vibration damping devices. The fluid filled device includes a first mounting member adapted to be attached to one of the two members; a second mounting member adapted to be attached to the other of the two members; an elastic body connecting the first and the second mounting members; a pressure-receiving chamber partially defined by the elastic body and filled with a non-compressible fluid; an equilibrium chamber partially defined by a flexible layer and filled with the non-compressible fluid; and an orifice passage permitting fluid communication between the pressure-receiving chamber and the equilibrium chamber. This fluid filled damping device is capable of exhibiting a desired vibration-damping effect on the basis of flows of the fluid through the orifice passage.

Generally, a fluid filled vibration-damping device is capable of damping vibrations in one direction which is generally in an axial direction with respect to the device. While this may be acceptable for a vibration-damping device when it is used as an engine mount, when these vibration-damping devices are used elsewhere in the vehicle, additional damping characteristics are needed for tuning the "noise, vibration and harshness" of the vehicle, especially when mounting a cab or a body on a frame.

SUMMARY OF THE INVENTION

The present invention provides the art with a hydraulically damped mount which makes it possible to have high damping at one particular frequency in the axial direction and also to have high damping at a different frequency in one direction orthogonal to the axial direction.

The vibration-damping device of the present invention utilizes two sets of chambers which act independently in pairs to provide the desired damping characteristics in directions that are generally perpendicular to each other.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
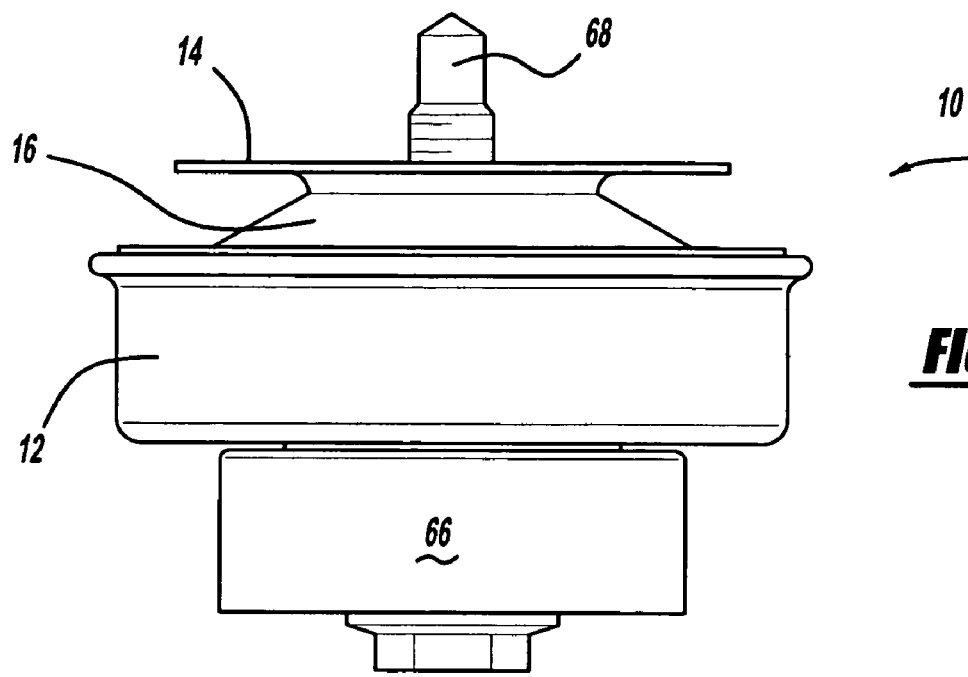
FIG. 1 is a side view of the hydraulically damped mount in accordance with the present invention.
Figure 2:
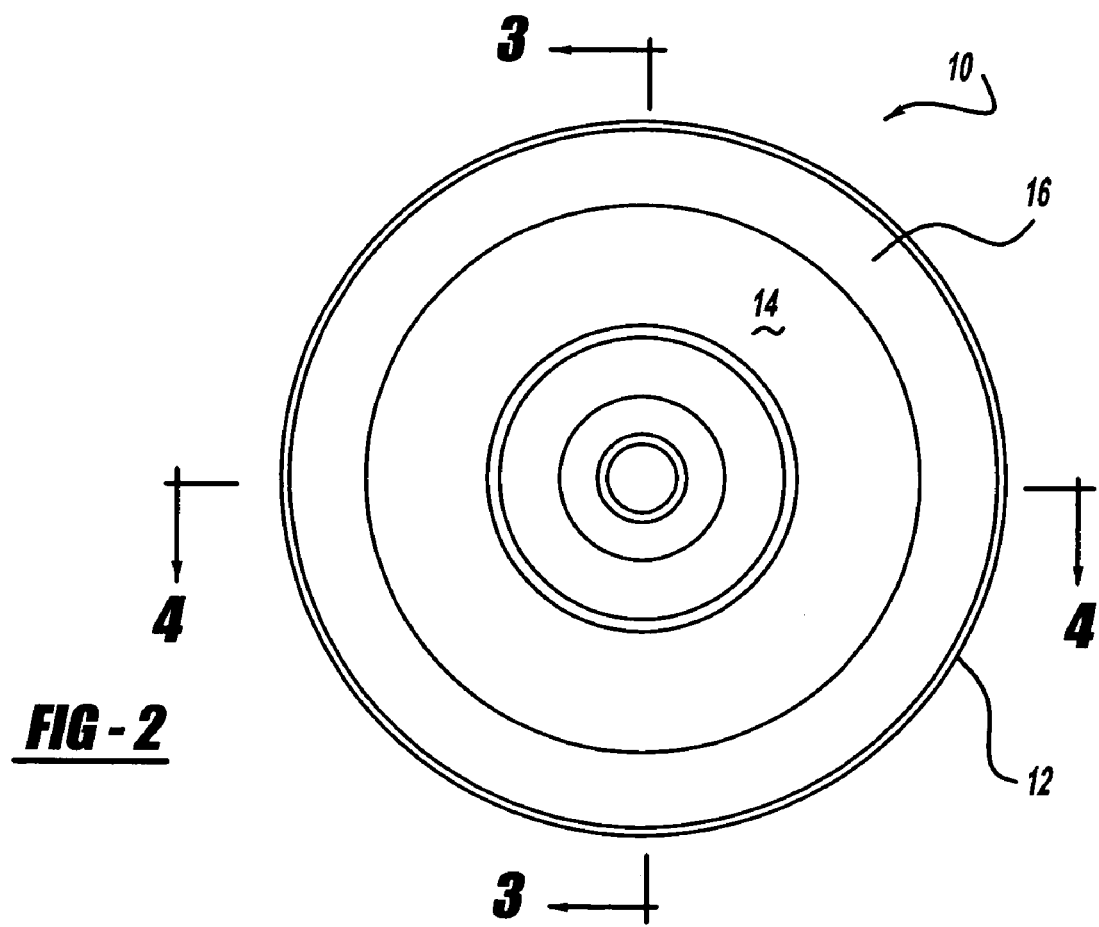
FIG. 2 is an end view of the mount illustrated in FIG. 1.
Figure 3:
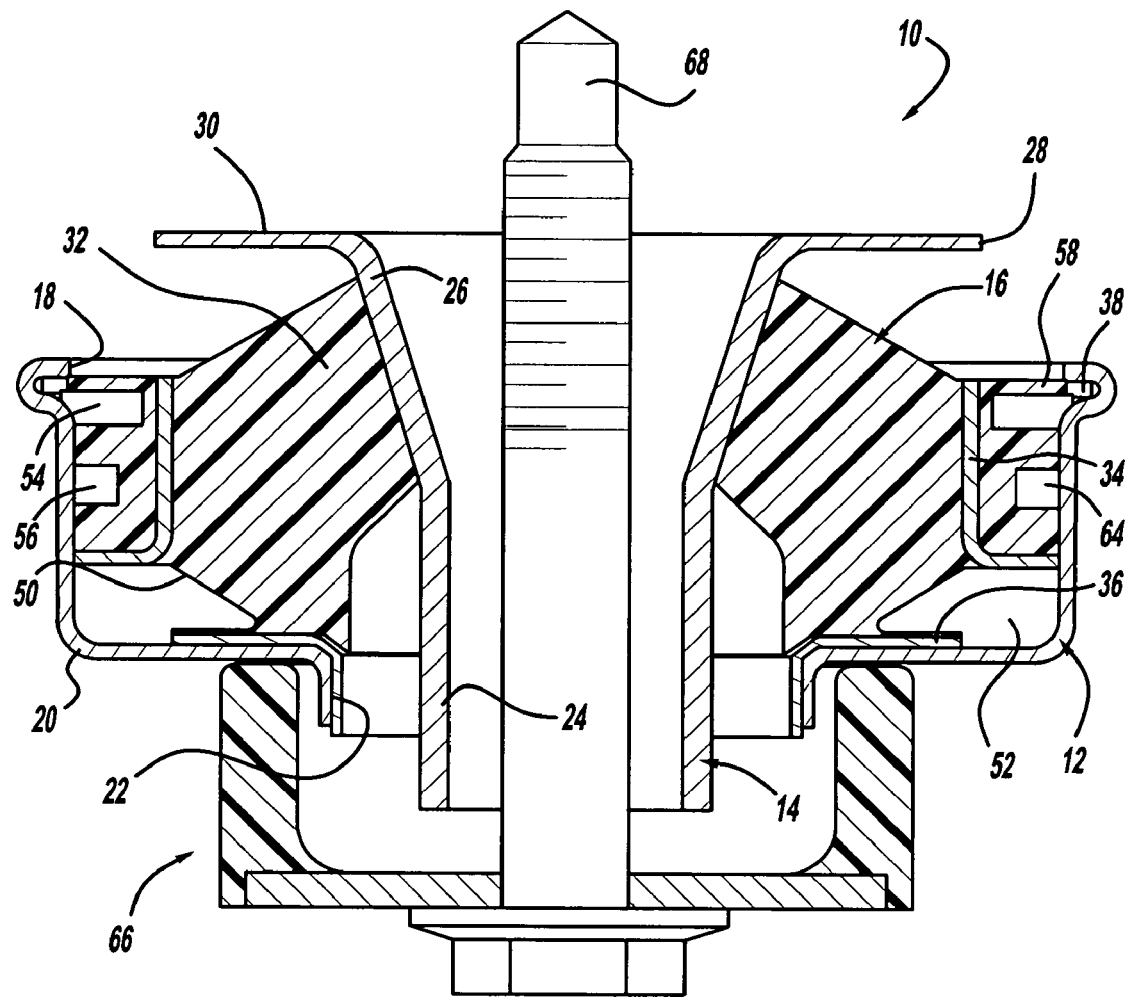
FIG. 3 is a cross-sectional view of the mount illustrated in FIGS. 1 and 2 taken in the direction of arrows 3-3 in FIG. 2.

The following description of the preferred embodiment(s) is merely exemplary in nature and is in no way intended to limit the invention, its application, or uses.

There is illustrated in FIGS. 1-5 a hydraulically damped mount in accordance with the present invention and which is designated generally by the reference numeral 10. Mount 10 comprises an outer metal 12, an inner metal 14 and a bushing assembly 16.

Outer metal 12 is a cup-shaped component which is adapted to be secured to one of the two members (not shown) attached together by mount 10. Outer metal 12 defines an open end 18 and a closed end 20. Closed end 20 defines a circular aperture 22.

Inner metal 14 is a cylindrical component that defines a longitudinal axis extending in an axial direction and a diametric direction generally perpendicular to the axial direction. Inner metal 14 includes a circular cylindrical portion 24 extending through aperture 22 of outer metal 12 and a frusto-conical cylindrical portion 26 which extends out of open end 18 of outer metal 12. A flange 28 extends radially outwardly from the end of portion 26 to form a mounting surface 30 which is designed to engage the other of the two members being attached by mount 10.

Bushing assembly 16 is located between outer metal 12 and inner metal 14. Bushing assembly 16 comprises an elastomeric bushing 32, an internal tube 34, a support disc 36 and a support ring 38. Inner metal 14, elastomeric bushing 32, internal tube 34, support disc 36 and support ring 38 are molded into a single component with inner metal 14, internal tube 34, support disc 36 and support ring 38 being bonded to elastomeric bushing 32. Once molded, bushing assembly 16 is inserted into outer metal 12 and open end 18 of outer metal 12 is crimped or formed over support ring 38 to retain bushing assembly 16 within outer metal 12. Support disc 36 provides support for the interface between outer metal 12 and elastomeric bushing 32.

Figure 5:
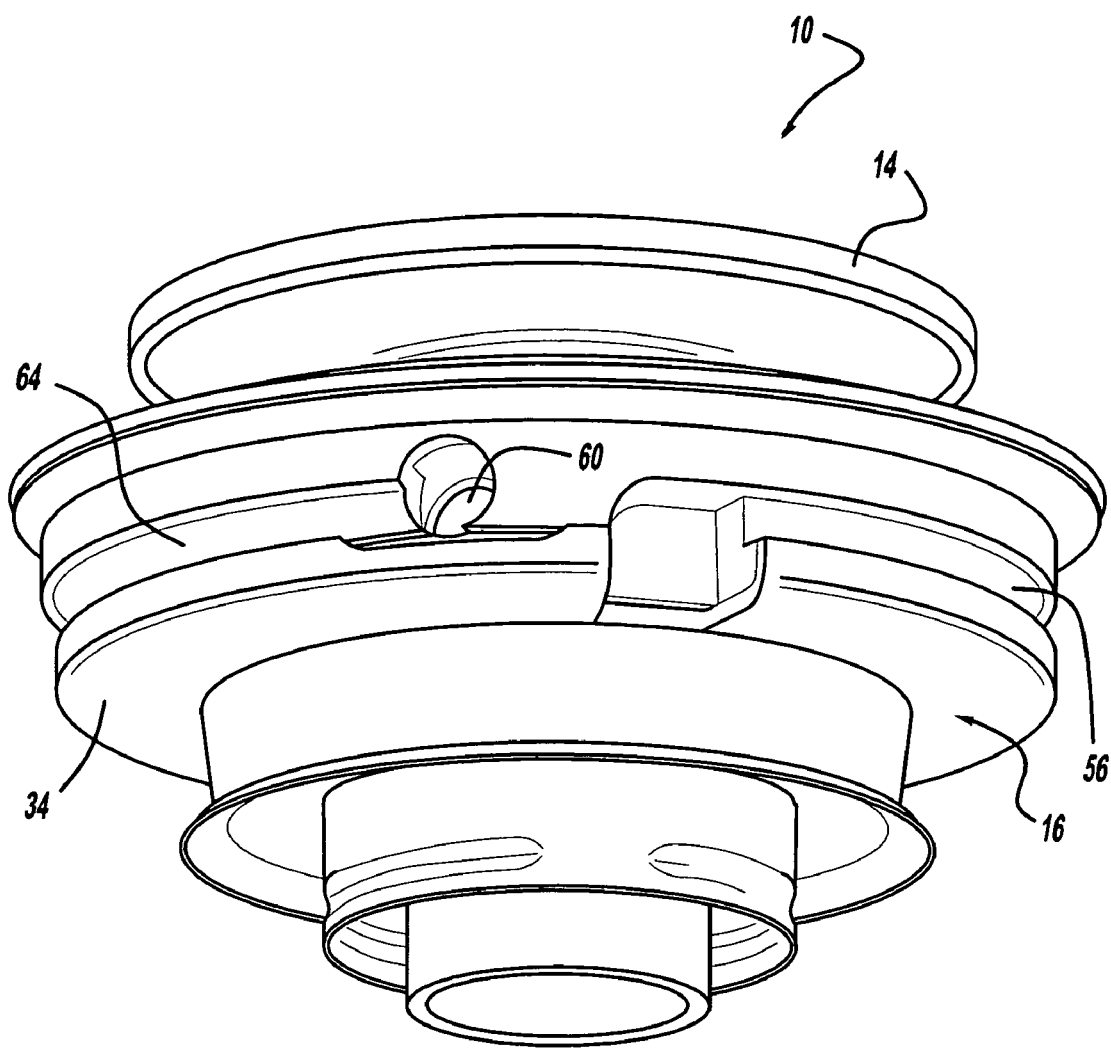
FIG. 5 is a cutaway perspective view illustrating the passages interconnecting the various chambers.

An angular wall 50 of elastomeric bushing 32 and outer metal 12 define a first or lower annular chamber 52. In addition, elastomeric bushing 32 and outer metal 12 also define a second or upper annular chamber 54 which is axially spaced from lower annular chamber 52 and a fluid passageway 56 extending between chambers 52 and 54. Fluid passageway 56 extends circumferentially around a radially outer surface of elastomeric bushing 32 and through one leg of internal tube 34 as shown in FIG. 5. Lower annular chamber 52, upper annular chamber 54 and fluid passageway 56 are all filled with a non-compressible fluid which in the preferred embodiment is a mixture of glycol and water. Internal tube 34 provides support for upper annular chamber 54 and fluid passageway 56 during the damping movement of mount 10.

During axial movement of inner metal 14 with respect to outer metal 12 or an axial movement of outer metal 12 with respect to inner metal 14, (up and down in FIGS. 3 and 4.) angular wall 50 of elastomeric bushing 32 deflects such that the volume of lower annular chamber 52 increases or decreases. The change in volume of lower annular chamber 52 causes the non-compressible fluid to flow through fluid passageway 56 between lower annular chamber 52 and upper annular chamber 54. The direction of the non-compressible fluid flow will be determined by whether lower annular chamber 52 is increasing or decreasing in volume. In order to accommodate an increase or decrease in the volume of upper annular chamber 54 when lower annular chamber 52 decreases or increases, respectively, in volume, an upper annular wall 58 of elastomeric bushing 32 forms a diaphragm which will deflect or bulge out or in. The support and attachment of support ring 38 maintains the integrity of upper annular chamber 54. The design of fluid passageway 56, lower annular chamber 52 and upper annular chamber 54 will determine the damping characteristics for axial movement of mount 10.

Figure 4:
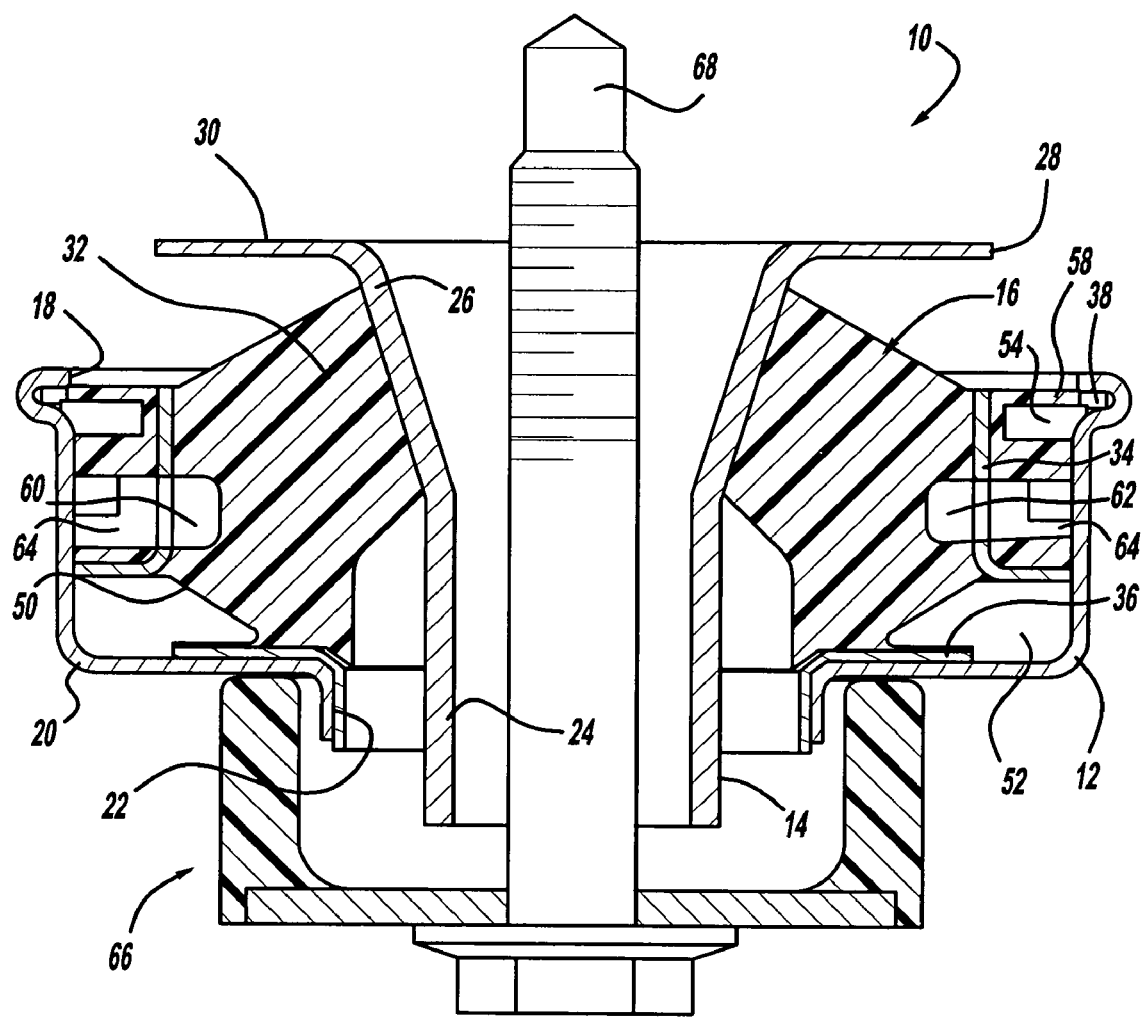
FIG. 4 is a cross-sectional view of the mount illustrated in FIGS. 1 and 2 taken in the direction of arrows 4-4 in FIG. 2.

Elastomeric bushing 32 and outer metal 12 define a third fluid chamber 60, a fourth fluid chamber 62 located diametrically opposite to third fluid chamber 60 and a fluid passageway 64 extending between third and fourth fluid chambers 60 and 62. Fluid passageway 64 extends circumferentially around a radially outer surface of elastomeric bushing 32 and through one leg of internal tube 34 as illustrated in FIGS. 4 and 5. Third fluid chamber 60, fourth fluid chamber 62 and fluid passageway 64 are filled with a non-compressible fluid which in the preferred embodiment is a mixture of glycol and water. Internal tube 34 provides support for third fluid chamber 60, fourth fluid chamber 62 and fluid passageway 64, during the damping movement of mount 10.

During a translational movement of inner metal 14 with respect to outer metal 12 or translational movement of outer metal 12 with respect to inner metal 14, (right and left directions in FIG. 4), elastomeric bushing 32 will deflect to decrease the volume of either third fluid chamber 60 or fourth fluid chamber 62 depending on the direction of the movement. The decrease in volume of third fluid chamber 60 will cause the non-compressible fluid to flow from third fluid chamber 60 to fourth fluid chamber 62 through fluid passageway 64. In a similar manner, the decrease in volume of fourth fluid chamber 62 will cause the non-compressible fluid to flow from fourth fluid chamber 62 to third fluid chamber 60 through fluid passageway 64. The design for fluid passageway 64 and third and fourth fluid chambers 60 and 62 will determine the damping characteristics for translational movement (orthogonal to the axial movement) for mount 10. Third fluid chamber 60 and fourth fluid chamber 62 are located diametrically opposite to each other. Thus, the damping characteristics for mount 10 in a direction orthogonal to the axial direction will be at a maximum in the right and left directions illustrated in FIG. 4 and they will be at a minimum in the right and left directions illustrated in FIG. 3. Mount 10 also includes a rebound bumper or stop 66 as is well known in the art. A bolt 68 secures the two members being attached and mount 10 as an assembly.

Figure 6:
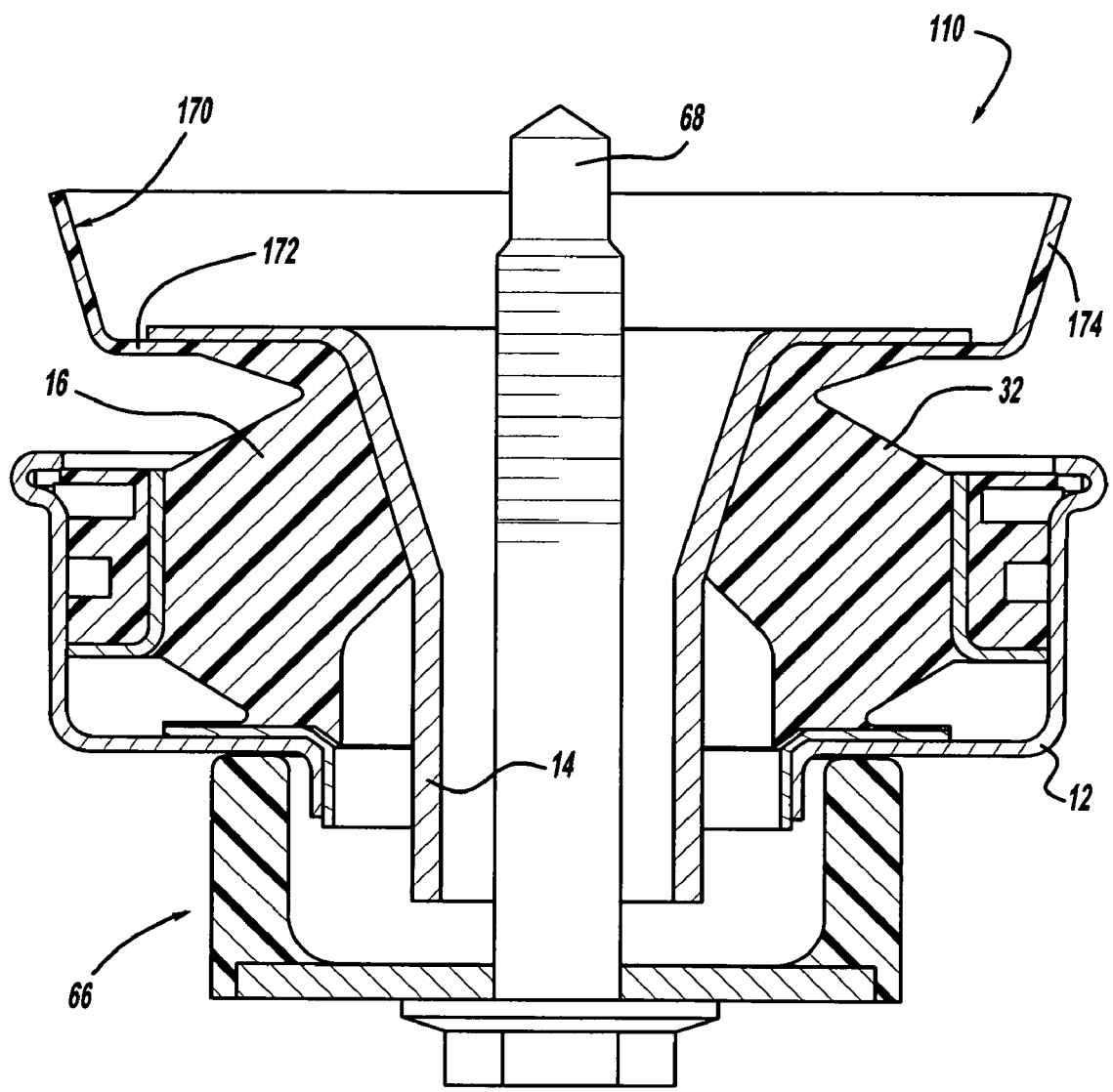
FIG. 6 is a cross-sectional view similar to FIG. 3 but illustrating a mount in accordance with another embodiment of the present invention in its as molded condition.
Figure 7:
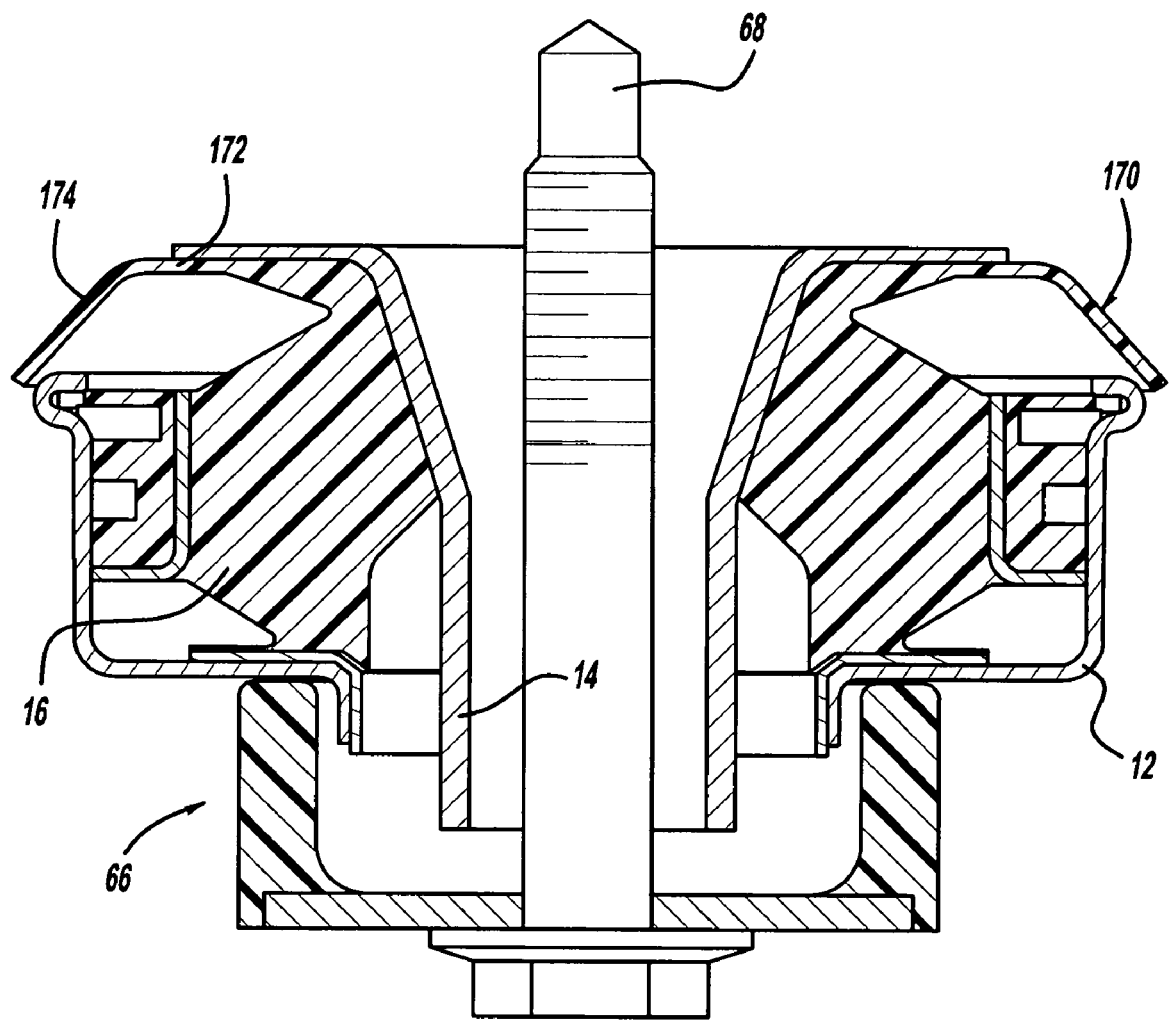
FIG. 7 is a cross-sectional view of the mount illustrated in FIG. 6 but showing the mount in its operating position.

Referring now to FIGS. 6 and 7, a hydraulically damped mount 110 in accordance with another embodiment of the present invention is illustrated. Mount 110 is the same as mount 10 except that an integrated dirt or heat shield 170 has been integrally molded with elastomeric bushing 32. Shield 170 comprises a generally horizontal or disc shaped portion 172 and an upwardly angled frusto-conical section 174 as illustrated in FIG. 6. Once molded, as illustrated in FIG. 6, shield 170 can be reversed to its working position illustrated in FIG. 7. Elastomeric shield 170 will flip through the middle position and into its working or mirror position as illustrated in FIG. 7 due to what is known as tin-lidding. Once reversed into its working position, shield 170 protects mount 110 from both heat and dirt contamination.

Figure 8:
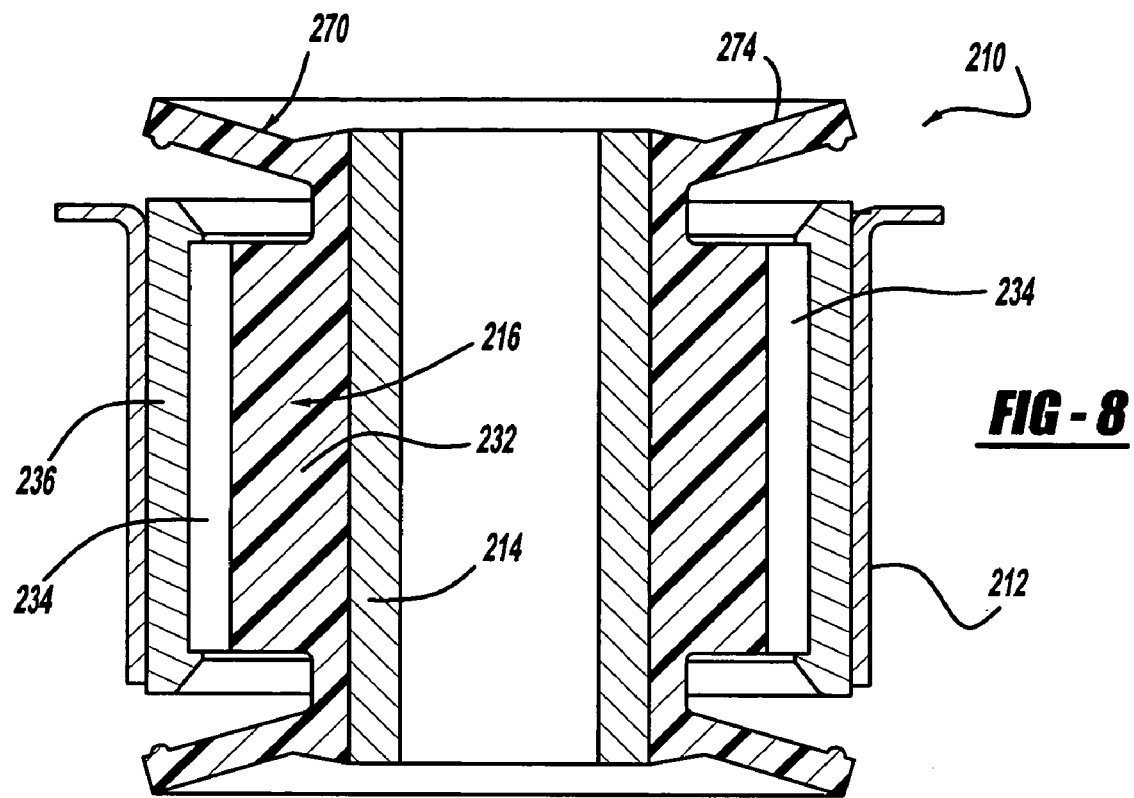
FIG. 8 is a cross-sectional view of a bushing in accordance with another embodiment of the present invention.
Figure 9:
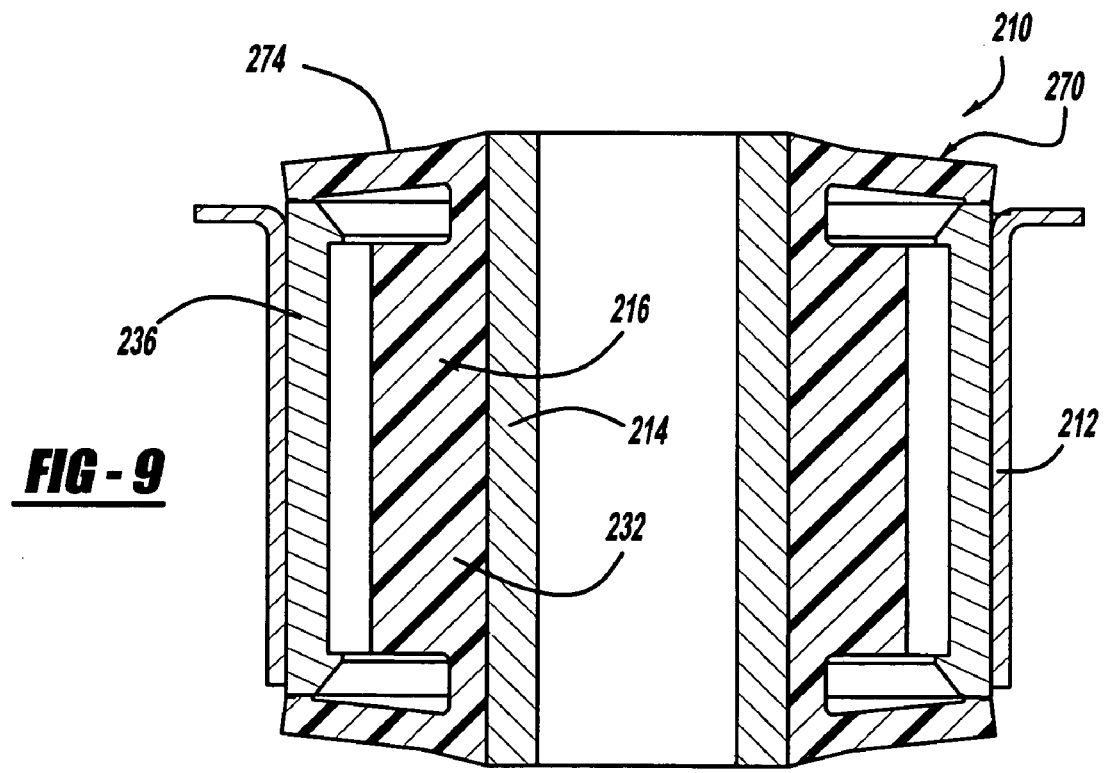
FIG. 9 is a cross-sectional view of the bushing illustrated in FIG. 8 but showing the mount in its operating position.

Referring now to FIGS. 8 and 9, an elastomeric mount 210 in accordance with another embodiment of the present invention is illustrated. Mount 210 comprises a tubular outer metal 212, a tubular inner metal 214 and an annular bushing assembly 216. Bushing assembly 216 is a cylindrical component comprising an elastomeric bushing 232 having a plurality of voids 234 and an outer housing 236.

Inner metal 214, elastomeric bushing 232 and outer housing 236 are molded with elastomeric bushing 232 being bonded to both inner metal 214 and outer housing 236. This assembly is then press-fit within outer metal 212 to complete the assembly of elastomeric mount 210. Mount 210 dampens the movement between outer metal 212 and inner metal 214 due to the deflection of elastomeric bushing 232. The design for elastomeric bushing 232 including the design of voids 234 will determine the damping characteristic for mount 210.

Similar to mount 110, mount 210 includes an integrated dirt or heat shield 270 integrally molded with elastomeric bushing 232. Shield 270 includes an upwardly angled wall 274 as illustrated in FIG. 8. Once molded, as illustrated in FIG. 8, shield 270 can be reversed to its working position illustrated in FIG. 9. Elastomeric shield 270 will flip through the middle position and into its working or mirror position as illustrated in FIG. 9 due to what is known as tin-lidding. Once reversed into its working position, shield 270 protects mount 210 from both heat and dirt contamination.

Figure 10:
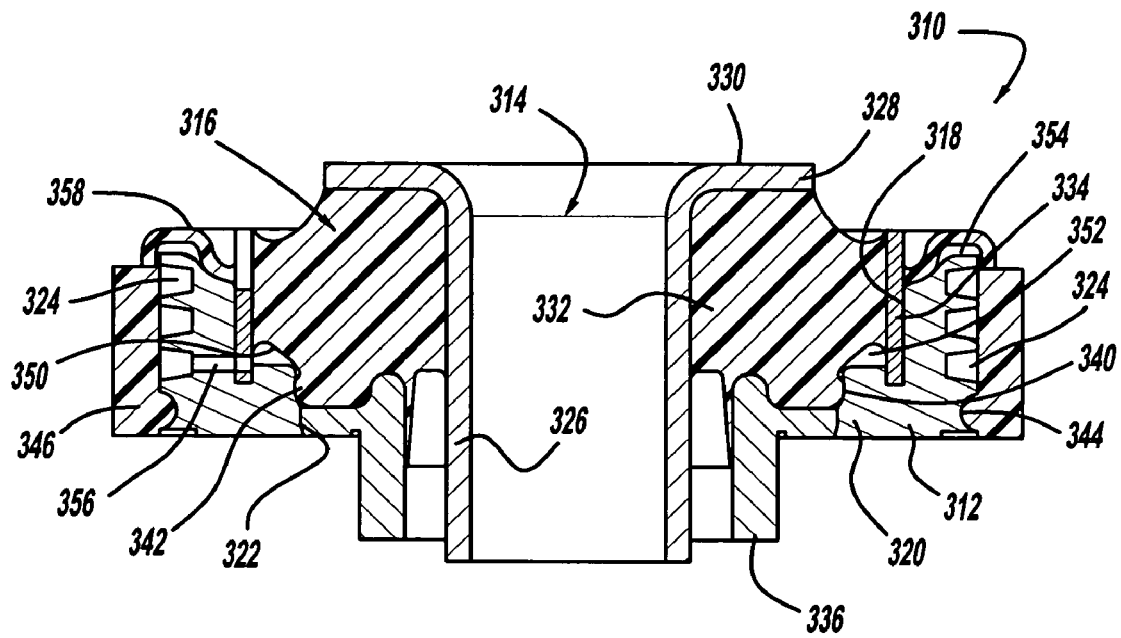
FIG. 10 is a cross-sectional view of a hydraulically damped mount in accordance with another embodiment of the present invention.

Referring now to FIG. 10, a hydraulically damped mount in accordance with another embodiment of the present invention is illustrated and is designated generally by the reference numeral 310. Mount 310 comprises a die-cast case 312, an inner metal 314 and a bushing assembly 316.

Die-cast case 312 is an annular member which is adapted to be secured to one of the two members (not shown) attached together by mount 310. Die-cast case 312 defines an open end 318; a closed end 320 defining a circular aperture 322 and a channel 324.

Inner metal 314 is a cylindrical component that includes a circular cylindrical portion 326 extending through aperture 322 of die-cast case 312. A flange 328 extends radially outwardly from the end of portion 326 to form a mounting surface 330 which is designed to engage the other of the two members being attached by mount 310.

Bushing assembly 316 is located between die-cast case 312 and inner metal 314. Bushing assembly 316 comprises an elastomeric bushing 332, an internal tube 334 and a die-cast tube 336. Inner metal 314, elastomeric bushing 332, internal tube 334 and die-cast tube 336 are molded into a single component with inner metal 314, internal tube 334 and die-cast tube 336 being bonded to elastomeric bushing 332. Once molded, bushing assembly 316 is inserted into die-cast case 312 and internal tube 334 is press fit within open end 318 of die-cast case 312 and die-cast tube 336 is press fit within aperture 322 of die-cast case 312. While being described as being press-fit within aperture 322 of die-cast case 312, other method of attaching these two components is possible including but not limited to the method described below for FIG. 11.

Once assembled to die-cast case 312, elastomeric bushing 332 sealingly engages die-cast 312 at an inner surface 340 due to an O-ring style seal 342 being formed into elastomeric bushing 332 and at an outer surface 344 due to a rubber band type seal 346 also formed into elastomeric bushing 332.

An angular wall 350 of elastomeric bushing 332 and die-cast case 312 define a first or lower chamber 352. In addition, elastomeric bushing 332 and die-cast case 312 form a second or upper chamber 354. Channel 324 and a fluid passageway 356 in die-cast case 312 connects chambers 352 and 354. Fluid passageway 356 extends through internal tube 334. Lower annular chamber 352, upper annular chamber 354, channel 324 and fluid passageway 356 are all filled with a non-compressible fluid which in the preferred embodiment is a mixture of glycol and water.

During axial movement of inner metal 314 with respect to die-cast case 312, (up and down in FIG. 10), angular wall 350 of elastomeric bushing 332 deflects such that the volume of lower annular chambers 352 increases or decreases. The change in volume in lower annular chamber 352 causes the non-compressible fluid to flow through fluid passageway 356, through channel 324, between lower annular chamber 352 and upper annular chamber 354. The direction of fluid flow will be determined by whether lower annular chamber 352 is increasing or decreasing in volume. In order to accommodate an increase or decrease in volume of upper annular chamber 354, an upper annular wall 358 of elastomeric bushing 332 forms a diaphragm which will deflect or bulge in or out. The design of channel 324, fluid passageway 356 and chambers 352 and 354 will determine the damping characteristics for axial movement of mount 310.

Figure 11:
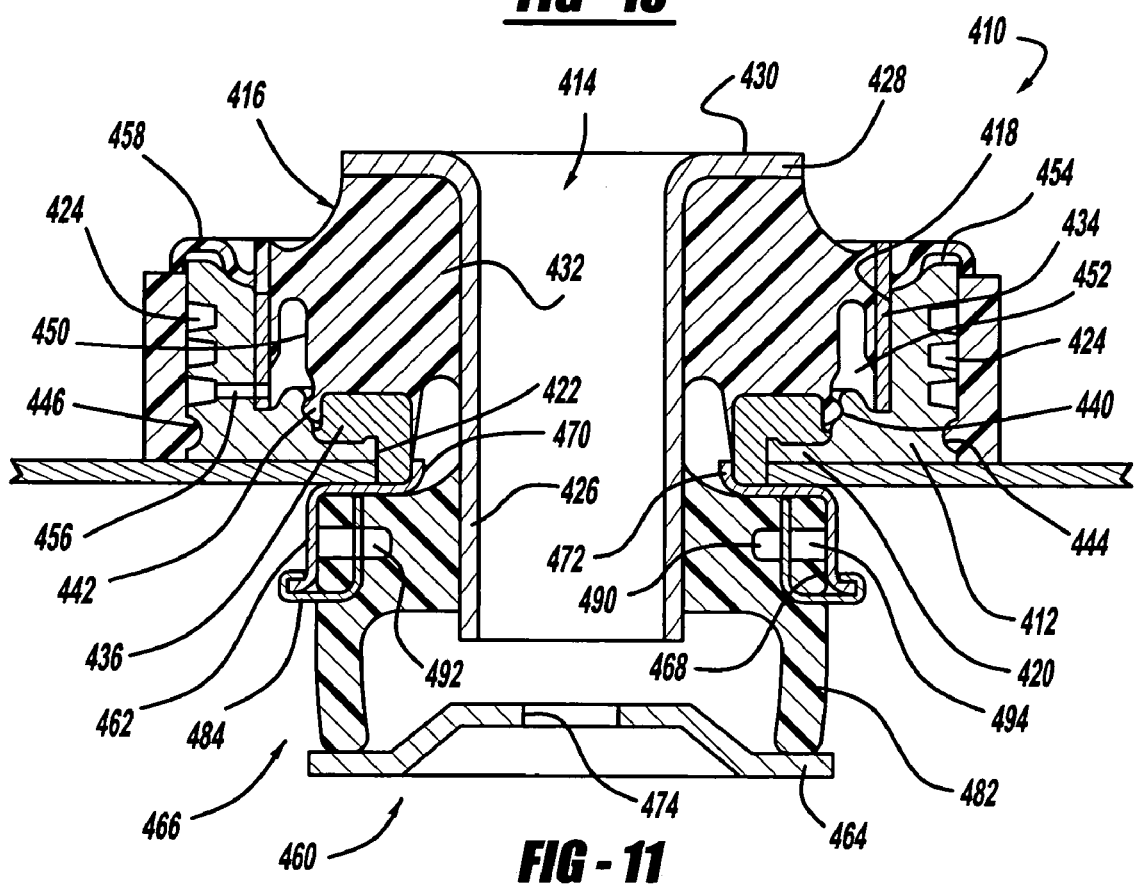
FIG. 11 is a cross-sectional view of a hydraulically damped mount in accordance with another embodiment of the present invention.

Referring now to FIG. 11, a hydraulically damped mount in accordance with another embodiment of the present invention is illustrated and is designated generally by the reference numeral 410. Mount 410 comprises a die-cast case 412, an inner metal 414 and a bushing assembly 416.

Die-cast case 412 is an annular member which is adapted to be secured to one of the two members (only one shown) attached together by mount 410. Die-cast case 412 defines an open end 418; a closed end 420 defining a circular aperture 422 and a channel 424.

Inner metal 414 is a cylindrical component that includes a circular cylindrical portion 426 extending through aperture 422 of die-cast case 412. A flange 428 extends radially outwardly from the end of portion 426 to form a mounting surface 430 which is designed to engage the other of the two members being attached by mount 410.

Bushing assembly 416 is located between die-cast case 412 and inner metal 414. Bushing assembly 416 comprises an elastomeric bushing 432, an internal tube 434 and a die-cast tube 436. Inner metal 414, elastomeric bushing 432, internal tube 434 and die-cast tube 436 are molded into a single component with inner metal 414, internal tube 434 and die-cast tube 436 being bonded to elastomeric bushing 432. Once molded, bushing assembly 416 is inserted into die-cast case 412 and internal tube 434 is press fit within open end 418 of die-cast case 412 and die-cast tube 436 extends through aperture 322 of die-cast case 312 and is attached to die-cast case 312 by being pop-riveted or by other methods know well in the art.

Once assembled to die-cast case 412, elastomeric bushing 432 sealingly engages die-cast case 412 at an inner surface 440 due to an O-ring style seal 442 being formed into elastomeric bushing 432 and at an outer surface 444 due to a rubber band type seal 446 also formed into elastomeric bushing 432.

An angular wall 450 of elastomeric bushing 432 and die-cast case 412 define a first or lower chamber 452. In addition, elastomeric bushing 432 and die-cast case 412 form a second or upper chamber 454. Channel 424 and a fluid passageway 456 in die-cast case 412 connects chambers 452 and 454. Fluid passageway 456 extends through internal tube 434. Lower annular chamber 452, upper annular chamber 454, channel 424 and fluid passageway 456 are all filled with a non-compressible fluid which in the preferred embodiment is a mixture of glycol and water.

During axial movement of inner metal 414 with respect to die-cast case 412, (up and down in FIG. 11), angular wall 450 of elastomeric bushing 432 deflects such that the volume of lower annular chambers 452 increases or decreases. The change in volume in lower annular chamber 452 causes the non-compressible fluid to flow through fluid passageway 456, through channel 424, between lower annular chamber 452 and upper annular chamber 454. The direction of fluid flow will be determined by whether lower annular chamber 452 is increasing or decreasing in volume. In order to accommodate an increase or decrease in volume of upper annular chamber 454, an upper annular wall 458 of elastomeric bushing 432 forms a diaphragm which will deflect or bulge in or out. The design of channel 424, fluid passageway 456 and chambers 452 and 454 will determine the damping characteristics for axial movement of mount 410.

A rebound mount 460 is also attached to mount 410. Rebound mount 460 comprises an outer metal 462, an end cap 464 and a bushing assembly 466. Outer metal 462 is a cup-shaped component which defines an open end 468 and a closed end 470. Closed end 470 defines an outer flange 472 which is received within the internal diameter of die-cast tube 436 of bushing assembly 416.

End cap 464 is an annular member which defines a central aperture 474. Bolt 68 (not shown) extends through the two members being attached, inner metal 414 and end cap 464 to secure the mounting system.

Bushing assembly 466 is located between outer metal 462 and inner metal 414. Bushing assembly 466 comprises an elastomeric bushing 482 and an internal tube 484. Elastomeric bushing 482 and internal tube 484 are molded into a single component with internal tube 484 being bonded to elastomeric bushing 482. Once molded, bushing assembly 466 is inserted into outer metal 462 and the outer end of internal tube 484 is crimped or formed over open end 468 of outer metal 462 to retain bushing assembly 466 within outer metal 462. This assembly is then attached to mount 410 by assembling elastomeric bushing 482 over inner metal 414 and by engaging outer flange 472 with die-cast tube 436. Elastomeric bushing 482 can form an interference fit with inner metal 414 or elastomeric bushing 482 can be bonded to inner metal 414. When assembled to the vehicle, bolt 68 (not shown) extends through the two components being joined, inner metal 414 and end cap 464 to secure the mounting system. The gap between end cap 464 and inner metal 414 in conjunction with elastomeric bushing 482 acts as a rebound stop for the mounting system.

Elastomeric bushing 482 and outer metal 462 define a third fluid chamber 490, a fourth fluid chamber 492 located diametrically opposite to third fluid chamber 490 and a fluid passageway 494 extending between third and fourth fluid chambers 490 and 492. Fluid passageway 494 extends through one leg of internal tube 484. Third fluid chamber 490, fourth fluid chamber 492 and fluid passageway 494 are filled with a non-compressible fluid which in the preferred embodiment is a mixture of glycol and water. Internal tube 484 provides support for third fluid chamber 490, fourth fluid chamber 492 and fluid passageway 494, during the damping movement of rebound mount 460.

During a translational movement of inner metal 414 with respect to outer metal 462 or translational movement of outer metal 462 with respect to inner metal 414, (right and left directions in FIG. 11), elastomeric bushing 482 will deflect to decrease the volume of either third fluid chamber 490 or fourth fluid chamber 492 depending on the direction of the movement. The decrease in volume of third fluid chamber 490 will cause the non-compressible fluid to flow from third fluid chamber 490 to fourth fluid chamber 492 through fluid passageway 494. In a similar manner, the decrease in volume of fourth fluid chamber 492 will cause the non-compressible fluid to flow from fourth fluid chamber 492 to third fluid chamber 490 through fluid passageway 494. The design for fluid passageway 494 and third and fourth fluid chambers 490 and 492 will determine the damping characteristics for translational movement (orthogonal to the axial movement) for rebound mount 460. Third fluid chamber 490 and fourth fluid chamber 492 are located diametrically opposite to each other. Thus, the damping characteristics for rebound mount 460 in a direction orthogonal to the axial direction will be at a maximum in the right and left directions illustrated in FIG. 11 and they will be at a minimum in directions perpendicular to those shown in FIG. 11.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mount comprising:
    a cylindrical inner metal defining a central axis extending in an axial direction and a diametric direction generally perpendicular to said axial direction;
    an outer metal disposed around said inner metal to form a gap between said inner and outer metals;
    an elastomeric bushing disposed within said gap between said inner and outer metals, said elastomeric bushing including a wall covering said gap;
    a first annular chamber and a second annular chamber defined between said elastomeric bushing and said outer metal, said first and second annular chamber being spaced from each other in said axial direction;
    a first passageway extending between said first and second annular chambers, said first passageway defined by and extending circumferentially around a radially outer surface of said elastomeric bushing; and
    an internal tube disposed between said inner metal and said outer metal; wherein
    said second annular chamber is entirely disposed between said internal tube and said outer metal.

2. The mount according to claim 1, wherein said first passageway is defined by said elastomeric bushing and an inner surface of said outer metal.

3. The mounting according to claim 1, wherein said first passageway is disposed between said internal tube and said outer metal.

4. A mount comprising:
    a cylindrical inner metal defining a central axis extending in an axial direction and a diametric direction generally perpendicular to said axial direction;
    an outer metal disposed around said inner metal to form a gap between said inner and outer metals;
    an elastomeric bushing disposed within said gap between said inner and outer metals, said elastomeric bushing including a wall covering said gap;
    a first annular chamber and a second annular chamber defined between said elastomeric bushing and said outer metal, said first and second annular chamber being spaced from each other in said axial direction;
    a first passageway extending between said first and second annular chambers, said first passageway defined by and extending circumferentially around a radially outer surface of said elastomeric bushing; and
    a third chamber and a fourth fluid chamber defined between said elastomeric bushing and said outer metal, said third and fourth fluid chambers being spaced from each other in said diametric direction.

5. The mounting according to claim 4, further comprising a second passageway in communication with said third and fourth chambers, said second passageway defined by and extending circumferentially around an outer surface of said elastomeric bushing.

6. The mounting according to claim 5, wherein the chambers and passageways are filled with a fluid, a first damping characteristic being defined in said axial direction by said first chamber, said first passageway and said second chamber, and a second damping characteristic being defined in said diametric direction by said third chamber, said second passageway and said second chamber.

7. The mounting according to claim 5, further comprising an internal tube disposed between said inner metal and said outer metal, said first and second passageway being disposed between said internal tube and said outer metal.

8. The mounting according to claim 4, further comprising an internal tube disposed between said inner metal and said outer metal.

9. The mounting according to claim 8, wherein said second annular chamber is entirely disposed between said internal tube and said outer metal.

10. A mount comprising:
    a cylindrical inner metal defining a central axis extending in an axial direction and a diametric direction generally perpendicular to said axial direction;
    an outer metal disposed around said inner metal; and
    an elastomeric bushing disposed between said inner and outer metals; wherein:
    said elastomeric bushing defines a first annular fluid chamber, a second annular fluid chamber and a first fluid passageway connecting said first and second annular fluid chambers, movement of one of said inner and outer metals with respect to the other of said inner and outer metals in the axial direction being controlled by said first annular fluid chamber, said second annular fluid chamber and said first fluid passageway;
    said elastomeric bushing defines a third fluid chamber, a fourth fluid chamber and a second fluid passageway connecting said third and fourth fluid chambers, movement of one of said inner and outer metals with respect to the other of said inner and outer metals in the diametric direction being controlled by said third fluid chamber, said fourth fluid chamber and said second fluid passageway;
    said first annular fluid chamber, said second annular fluid chamber and said first fluid passageway being sealed from said third fluid chamber, said fourth fluid chamber and said second fluid passageway.

11. The mounting according to claim 10, wherein the chambers and the passageways are filled with a fluid, a first damping characteristic being defined in said axial direction by said first annular fluid chamber, said first fluid passageway and said second annular fluid chamber, and a second damping characteristic being defined in said diametric direction by said third chamber, said second fluid passageway and said fourth chamber.

12. The mounting according to claim 10, wherein said first passageway is defined by said elastomeric bushing and said outer metal.

13. The mounting according to claim 12, wherein said second passageway is defined by said elastomeric bushing and said outer metal.

14. The mounting according to claim 10, further comprising an internal tube disposed between said inner metal and said outer metal.

15. The mounting according to claim 10, wherein said first and second annular fluid chamber are disposed opposite to each other in the axial direction.

16. The mounting according to claim 15, wherein said third and fourth fluid chambers are disposed opposite to each other in the diametric direction.

17. The mounting according to claim 14, wherein said first and second passageway are disposed between said internal tube and said outer metal.

18. The mounting according to claim 14, wherein said second annular chamber is entirely disposed between said internal tube and said outer metal.

* * * * *